United States Patent
Vasinis

(10) Patent No.: US 9,423,057 B2
(45) Date of Patent: Aug. 23, 2016

(54) ACOUSTICAL SEAL SYSTEM

(71) Applicant: General Electric Company, Schenectady, NY (US)

(72) Inventor: Christophe Vasinis, Danjoutin (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/938,483

(22) Filed: Jul. 10, 2013

(65) Prior Publication Data
US 2015/0014943 A1  Jan. 15, 2015

(51) Int. Cl.
| | | |
|---|---|---|
| H02G 3/22 | (2006.01) |
| F16L 5/02 | (2006.01) |
| F01D 25/04 | (2006.01) |
| F16L 5/00 | (2006.01) |
| F16L 51/00 | (2006.01) |
| F16L 55/035 | (2006.01) |

(52) U.S. Cl.
CPC .............. *F16L 5/025* (2013.01); *F01D 25/04* (2013.01); *F16L 5/00* (2013.01); *F16L 51/00* (2013.01); *F16L 55/035* (2013.01)

(58) Field of Classification Search
CPC ............. F16L 5/00; F16L 5/502; F16L 5/025; F16L 5/10; F16L 51/00; F16L 55/035; F01D 25/04
USPC ......... 277/602, 603, 604, 606, 616, 630, 637, 277/632; 52/220.8, 219
See application file for complete search history.

(56) References Cited

U.S. PATENT DOCUMENTS

| | | | | |
|---|---|---|---|---|
| 1,084,281 | A * | 1/1914 | King ........................ | F16J 15/28 277/547 |
| 3,124,502 | A * | 3/1964 | Radke ...................... | F16J 15/20 277/536 |
| 3,695,639 | A * | 10/1972 | Shire et al. .................... | 285/114 |
| 3,977,137 | A * | 8/1976 | Patry .................. | E04D 13/1407 285/42 |
| 4,580,793 | A * | 4/1986 | Bronson ...................... | 277/547 |
| 5,417,932 | A * | 5/1995 | Castagnos, Jr. ........ | C10G 11/18 422/147 |
| 5,431,457 | A * | 7/1995 | Youngs ..................... | 285/136.1 |
| 5,722,699 | A * | 3/1998 | Brancher .................. | 285/142.1 |
| 5,967,567 | A * | 10/1999 | Nordstrom ................ | 285/139.1 |
| 6,086,117 | A * | 7/2000 | Youngs ......................... | 285/205 |
| 7,534,965 | B1 | 5/2009 | Thompson | |
| 2001/0001518 | A1* | 5/2001 | Shoemaker .................. | 277/519 |
| 2008/0078841 | A1* | 4/2008 | Messmer et al. ............. | 236/49.3 |

FOREIGN PATENT DOCUMENTS

CN  201589012 U  9/2010

* cited by examiner

*Primary Examiner* — Kristina Fulton
*Assistant Examiner* — Nathan Cumar
(74) *Attorney, Agent, or Firm* — Ernest G. Cusick; Hoffman Warnick LLC

(57) ABSTRACT

Various embodiments include systems and apparatuses adapted for acoustical insulation. In some embodiments apparatuses include a seal assembly for a conduit, the assembly includes a substantially inflexible collar member sized to form an axial seal around the conduit, the substantially inflexible collar member having a flange extending substantially radially and a substantially flexible axial seal member in sealing contact with the substantially inflexible collar member, the substantially flexible axial seal member including a first portion in sealing contact with a first face of the flange and a second portion in sealing contact with a second face of the flange, wherein the substantially flexible axial seal member and the substantially inflexible collar member maintain the axial seal around the conduit and permit axial movement, translational movement and rotational movement of the conduit relative to a conduit passage panel.

19 Claims, 6 Drawing Sheets

ACOUSTICAL SEAL SYSTEM

FIELD OF THE INVENTION

The subject matter disclosed herein relates generally to acoustical seals. More specifically, the disclosure provided herein relates to acoustical seals that can be used at a pipe crossing where a conduit traverses a wall or panel such that the seal allows for thermal expansion and conduit movement relative to the panel or wall.

BACKGROUND OF THE INVENTION

There is often a need for acoustical insulation in systems involving a conduit that crosses a wall or a panel, e.g. at a pipe crossing. Conventional acoustical seal systems for use with pipe crossings at walls, panels or enclosures often suffer from acoustical insulation deficiencies due to insufficient maintenance. Many conventional seal systems require that the seals are installed before the conduit is completely installed. Also, oftentimes, walls or panels used in conventional pipe crossing systems may include steel structures with acoustical panels.

Depending on the application that uses the acoustically-sealed system, the conduit may need to move in different directions. For example, the conduit may need to be able to move due to thermal expansion. When the conduit moves, a gap may form between the conduit and the panel, thus causing failure of the acoustical insulation. Conventional systems used to correct for acoustical failure due to gap formation caused by moving or expanding conduit, may employ mineral wool as an acoustical insulator. However, mineral wool is inefficient, not robust and requires maintenance.

Some conventional acoustical seal systems need to be installed prior to the installation of the conduit that they seal. Such systems may allow for angular movement of the conduit, however axial movement may not be facilitated or possible.

Some conventional acoustical seal systems may be completed after erection of the conduit and panel. Such systems may be made of multiple parts that are assembled into the seal system after the conduit and panel are already in place. One such system may include hemispherical parts that are designed to hold the conduit and where, once assembled, the hemispherical parts are allowed to rotate within sockets, thus allowing for angular movement of the conduit. Systems such as this may not allow for translational or axial movement of the conduit, as the hemispherical conduit holders are set in place within their sockets. Also, such systems may not allow for thermal expansion of the conduit while maintaining an acoustical seal.

BRIEF DESCRIPTION OF THE INVENTION

Various embodiments include systems and apparatuses adapted for acoustical insulation at a pipe crossing. In some embodiments apparatuses include a seal assembly for a conduit, the assembly includes a substantially inflexible collar member sized to form an axial seal around the conduit, the substantially inflexible collar member having a flange extending substantially radially and a substantially flexible axial seal member in sealing contact with the substantially inflexible collar member, the substantially flexible axial seal member including a first portion in sealing contact with a first face of the flange and a second portion in sealing contact with a second face of the flange, wherein the substantially flexible axial seal member and the substantially inflexible collar member maintain the axial seal around the conduit and permit axial movement, translational movement and rotational movement of the conduit relative to the panel.

A first aspect provides a seal assembly for a conduit, comprising: a substantially inflexible collar member sized to form an axial seal around the conduit, the substantially inflexible collar member having a flange extending substantially radially, and a substantially flexible axial seal member in sealing contact with the substantially inflexible collar member, the substantially flexible axial seal member including a first portion in sealing contact with a first face of the flange and a second portion in sealing contact with a second face of the flange, wherein the substantially flexible axial seal member and the substantially inflexible collar member maintain the axial seal around the conduit and permit axial movement, translational movement and rotational movement of the conduit relative to a conduit passage panel.

A second aspect provides an apparatus comprising: a conduit; a panel allowing the conduit to pass therethrough; and a seal in sealing contact with the conduit and the panel, the seal including a substantially inflexible collar member having a flange extending substantially radially, and a substantially flexible axial seal member in sealing contact with the substantially inflexible collar member, the substantially flexible axial seal member including a first portion in sealing contact with a first face of the flange and a second portion in sealing contact with a second face of the flange, wherein the substantially flexible axial seal member and the substantially inflexible collar member allow for thermal expansion of the conduit and maintain an axial seal around the conduit and permit axial movement, translational movement and rotational movement of the conduit, relative to the panel.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
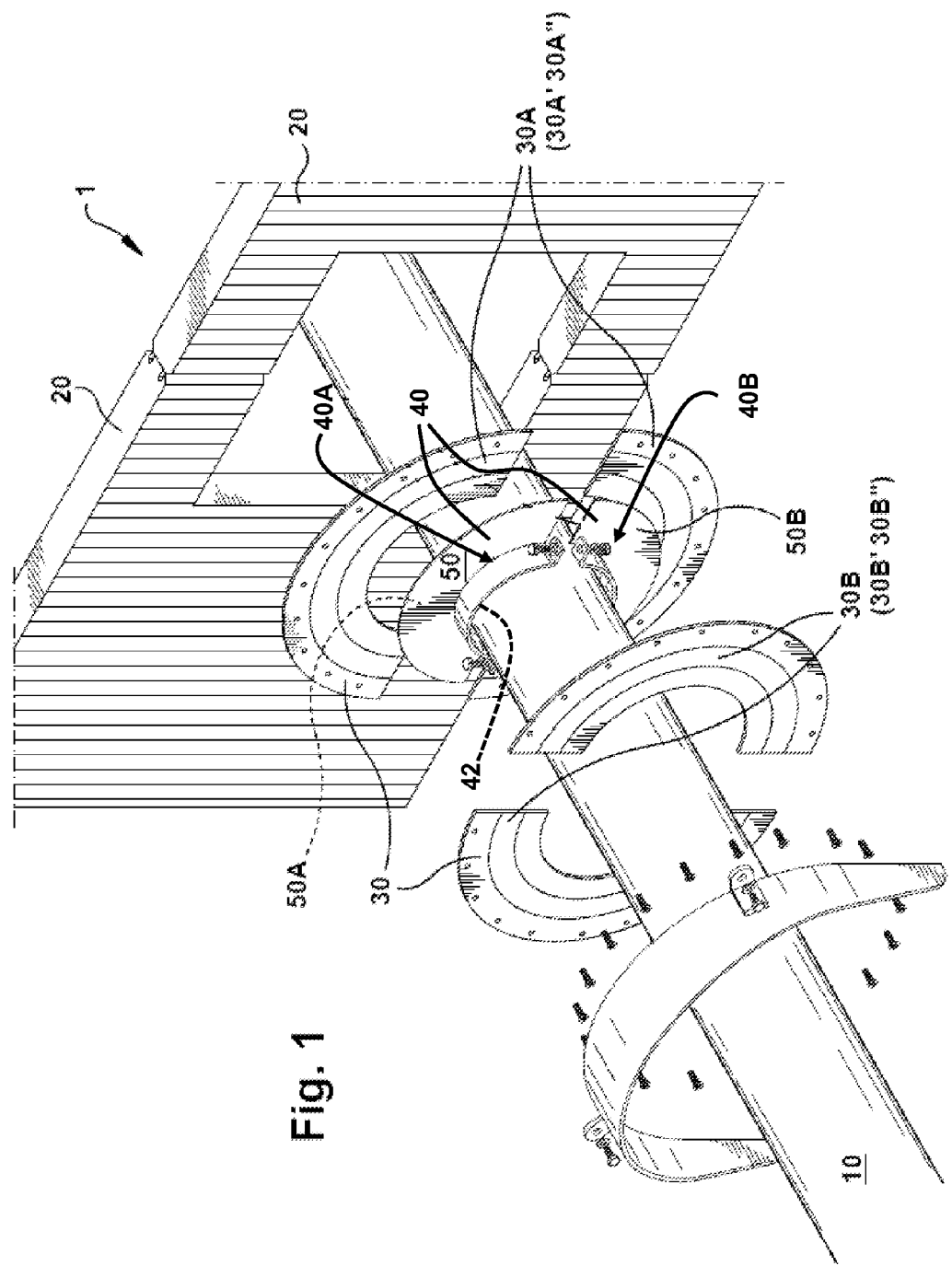
FIGS. 1-3 are isometric views of acoustical seal systems according to embodiments of the invention.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

The subject matter disclosed herein relates generally to acoustical seals. More specifically, the disclosure provided herein relates to acoustical seals used at a pipe crossing where a conduit traverses a wall or panel and where the seal allows for conduit movement due to thermal expansion or movement relative to the panel or wall. More specifically, acoustical seals described may be used in pipe crossings in power turbine systems and in systems where conduit carries synthetic gas or syngas.

As indicated herein, problems regarding the creation and maintenance of an acoustical seal at a pipe crossing are often encountered, especially after construction and installation of the conduit. Aspects of the invention provide for systems and devices adapted to acoustically seal one side of a panel from another, along an axis of a conduit that traversed the panel. Prior attempts at forming acoustical seals used at pipe crossings have resulted in systems where the seal is generally formed prior to installation of the conduit and panel and where the seal does not allow for sufficient movement of the conduit relative to the panel.

As differentiated from conventional acoustical seal systems, various embodiments described herein allow for sealing systems to be installed after the erection of the panel and conduit. Such embodiments may also allow for seal repair and maintenance without a need for dismantling the conduit or the panel, while allowing for thermal expansion of the conduit and while allowing for axial, translational and rotational movement of the conduit, relative to the panel.

According to various aspects described herein, a seal assembly for a conduit may include a substantially inflexible collar member sized to form an axial seal around the conduit. The seal may, for example, be an acoustical axial seal that lessens sound propagation in the direction of an axis of a conduit. According to aspects, the axial seal insulates sound propagation from one side of a conduit-traversing panel to the other side, in the direction of the conduit axis. Also according to aspects of the invention, the substantially inflexible collar member has a flange extending substantially radially. Also, aspects include a substantially flexible axial seal member in sealing contact with the collar member, the substantially flexible axial seal member including a first portion in sealing contact with a first face of the flange and a second portion in sealing contact with a second face of the flange. Under some aspects, the first and second portions of the seal member "sandwich" the flange and allow for sliding translational movement of the flange, relative to the panel. The substantially flexible axial seal member and the substantially inflexible collar member maintain the axial seal around the conduit and permit axial movement, translational movement and rotational movement of the conduit relative to the panel.

The seal system according to various aspects may be used in a turbine system or in other applications that require acoustical insulation at a pipe crossing, in systems where such insulation is desired. The sealing system may allow for thermal expansion of the conduit and the system allows translational, axial and rotational movement of the conduit with respect to the panel, while maintaining an acoustic seal. The flexible nature of the sealing system typically results in performance improvement, offering low-maintenance acoustical insulation that can be installed after installation of the conduit and panel, and that can be repaired or replaced without removal of the conduit or panel.

Turning to FIG. 1, an isometric drawing illustrating a seal assembly for a conduit, according to embodiments is shown. Conduit 10 is illustrated traversing panel 20 in seal assembly 1. Panel 20 may include acoustic panels. Substantially flexible axial seal member 30 is illustrated in many pieces separated for clarity. In some embodiments seal member 30 includes a first portion 30A and a second portion 30B, and some embodiments include first semicircular plate 30A' and second semicircular plate 30A" of seal member first portion 30A. Likewise, aspects may include third and fourth semicircular plates 30B' and 30B", respectively, of seal member second portion 30B. First and second semicircular plates 30A' and 30A" may mate with one another in response to being in sealing contact with the conduit 10 and third and fourth semicircular plates 30B' and 30B" may also mate with one another in response to being in sealing contact with the conduit 10. Substantially inflexible collar 40 is sized to form an axial seal around conduit 10. Collar 40 may include a material of equal or greater coefficient of thermal expansion than a material of conduit 10. Collar 40 is illustrated including flange 50, extending in directions radial to the circular shape of collar 40. Collar 40 and flange 50 are shown as circular, and disk-shaped, respectively, however other shapes are contemplated, including, but not limited to oval or rectangular, so long as an inner surface 42 of collar 40 substantially complements the outer surface of conduit 10. Collar 40 may include a first part 40A and a second part 40B. First part 40A and second part 40B may mate with one another in response to being in sealing contact with conduit 10.

When assembly 1 is assembled, seal member 30 is in sealing contact with collar 40. Seal member 30 illustrated having a first portion 30A in sealing contact with a first face 50A of flange 50. Seal member 30 is further illustrated having a second portion 30B in sealing contact with a second face 50B of flange 50. When assembled, axial seal member 30 and collar 40 maintain the axial seal around conduit 10, permit thermal expansion of conduit 10 and permit axial movement, translational movement and rotational movement of conduit 10 relative to panel 20. It should be noted that embodiments allow for sliding translational movement of flange 50 relative to panel 20, when flange 50 is in sealing contact with first and second seal portions 30A and 30B, respectively. Seal member 30 may include acoustically-insulating material.

Figure 2:
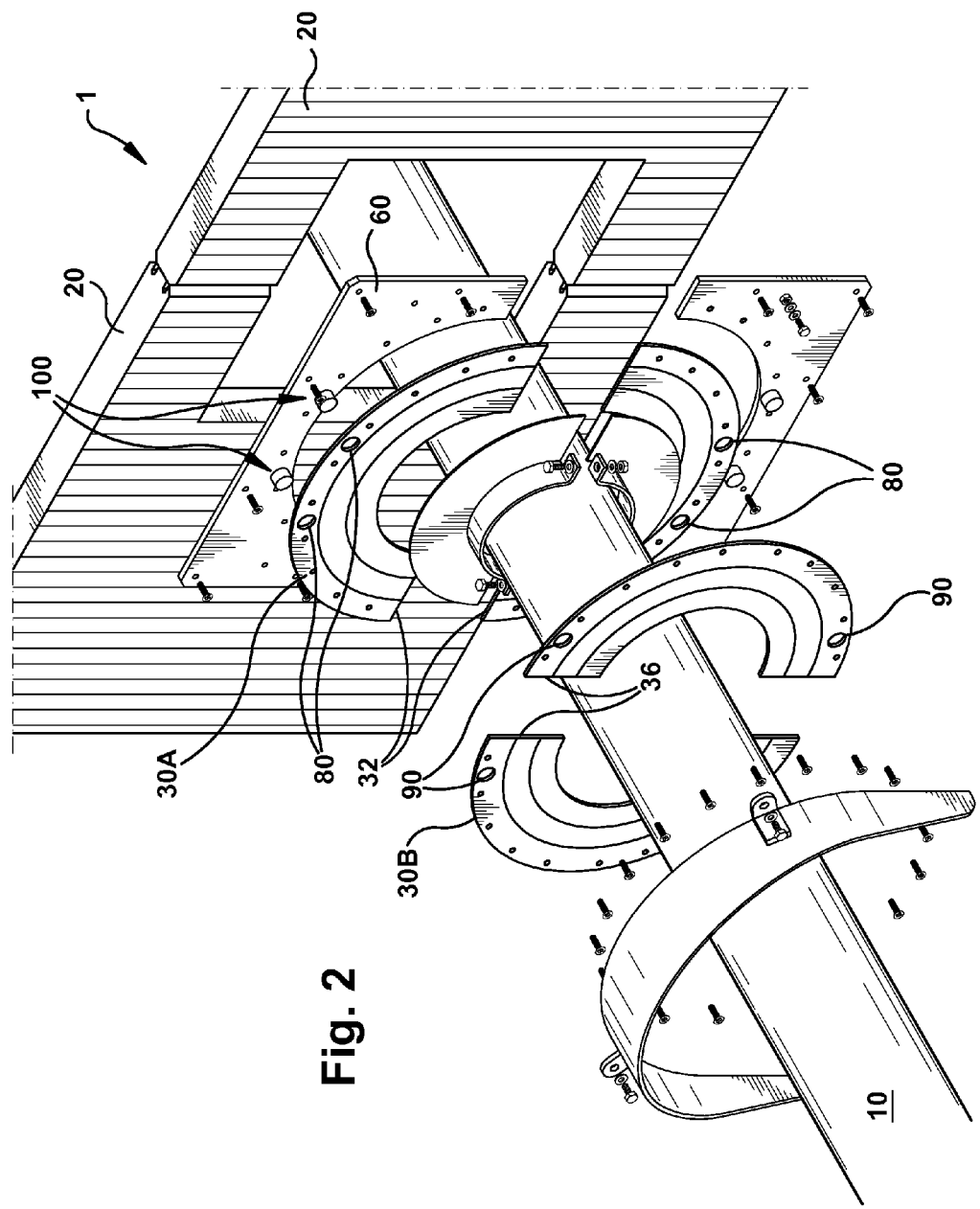

FIG. 2 illustrates seal assembly 1 with adapter 60. Adapter 60 is used for mounting substantially flexible axial seal member 30 to conduit passage panel 20. Adapter 60 is sized to receive conduit 10, adapter 60 being in sealing contact with one of the first portion 30A and the second portion 30B of seal member 30. FIG. 2 illustrates a configuration where adapter 60 would contact first portion 30A of seal member 30, but this configuration is merely exemplary and adapter 60 may contact either first or second portion 30A and 30B of seal member 30. Conduit passage panel 20 having a hole therethrough larger than the substantially flexible axial seal member 30. Other configurations are contemplated, for example where seal member 30 is the substantially the same size as the hole though panel 20.

First and second semicircular plates, 30A' and 30A" of seal member first portion 30A include mounting assembly first part 80. First and second semicircular plates, 30A' and 30A" of seal member first portion 30A meet at a first junction 32. Third and fourth semicircular plates 30B' and 30B" of seal member second portion 30B include mounting assembly second part 90. Third and fourth semicircular plates 30B' and 30B" of seal member second portion 30B meet at a second junction 36, with first junction 32 being orthogonal to second junction 36. Other configurations than first and second junctions 32 and 36, respectively being orthogonal to one another are within the scope of this disclosure, but the orthogonal arrangement as shown maybe useful for structural integrity of assembly 1.

Adapter 60 includes mounting assembly third part 100. As illustrated, mounting assembly first and second parts 80 and 90, respectively, are illustrated as holes and mounting assembly third part 100 is illustrated as pins that mate with or are complementary to the holes of mounting assembly first and second parts 80 and 90, respectively.

As can be understood from the illustration in FIG. 2, the mounting assembly parts may assist with alignment of the different members of the seal assembly 1 during fabrication. As can be seen, first through fourth semicircular plates, 30A', 30A", 30B', and 30B" of seal member 30 may be mounted on adapter 60 by sliding holes 80, 90 over pins 100 while assembling the system. It should be noted that the holes 80, 90 and pins 100 are exemplary structures and mounting parts other than holes and pins are within the scope of the invention, so long as the parts are complementary, as described. As a non-limiting example, the holes and pins may be interchanged or the shapes of the mounting parts may be different than those shown.

Figure 3:
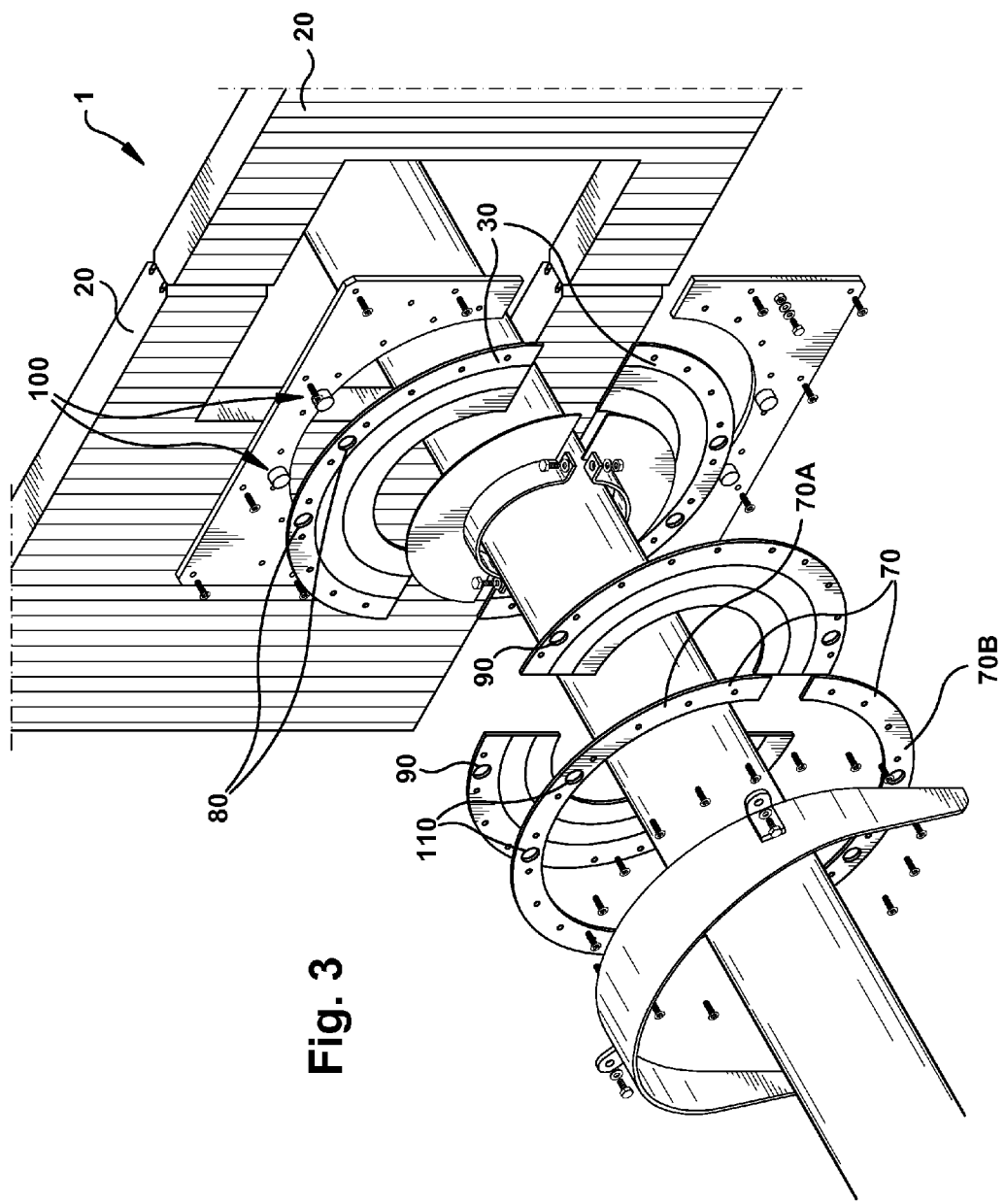

FIG. 3 illustrates seal assembly 1 with support 70 which includes first semicircular plate 70A and second semicircular plate 70B. Each of first and second support semicircular plate, 70A and 70B includes mounting system fourth part 110. As can be seen, mounting system fourth part 110 is complementary to mounting system third part 100 and the complementary nature of these parts is described above with respect to mounting system first, second and third parts, 80, 90 and 100, respectively. The holes illustrated in FIG. 3 are non-limiting examples of structures that may be used for mounting system fourth part 110. Support 70 and adapter 60 may include materials having the same or substantially identical coefficient of thermal expansion, and they may also be of the same or similar material composition.

Figure 4A:
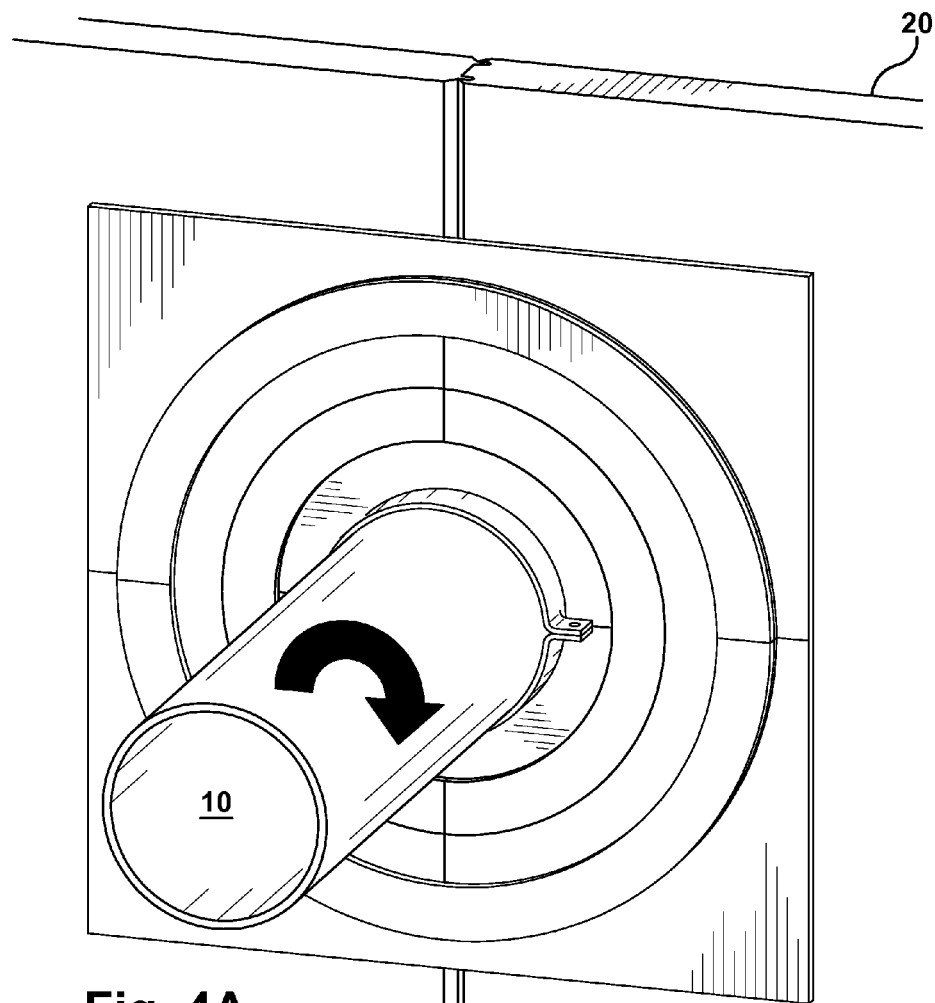
FIG. 4 illustrates rotational movement of a conduit relative to a panel according to embodiments of the invention.
Figure 4B:
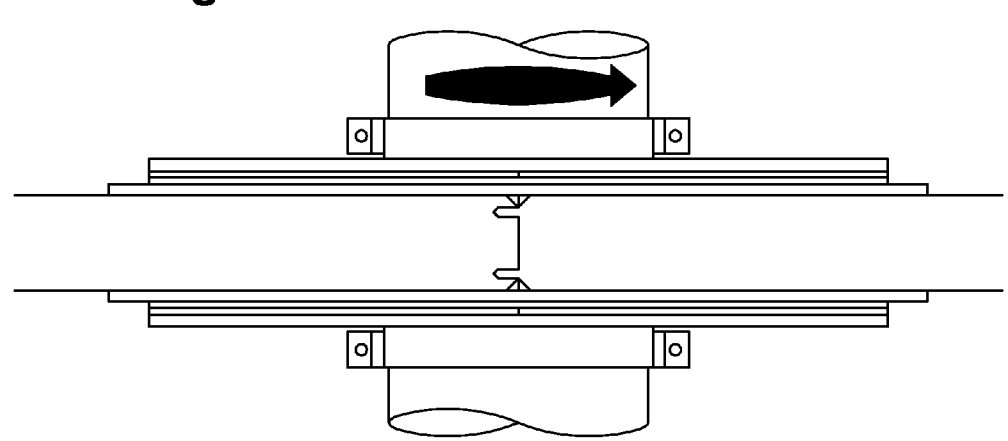
Figure 5A:
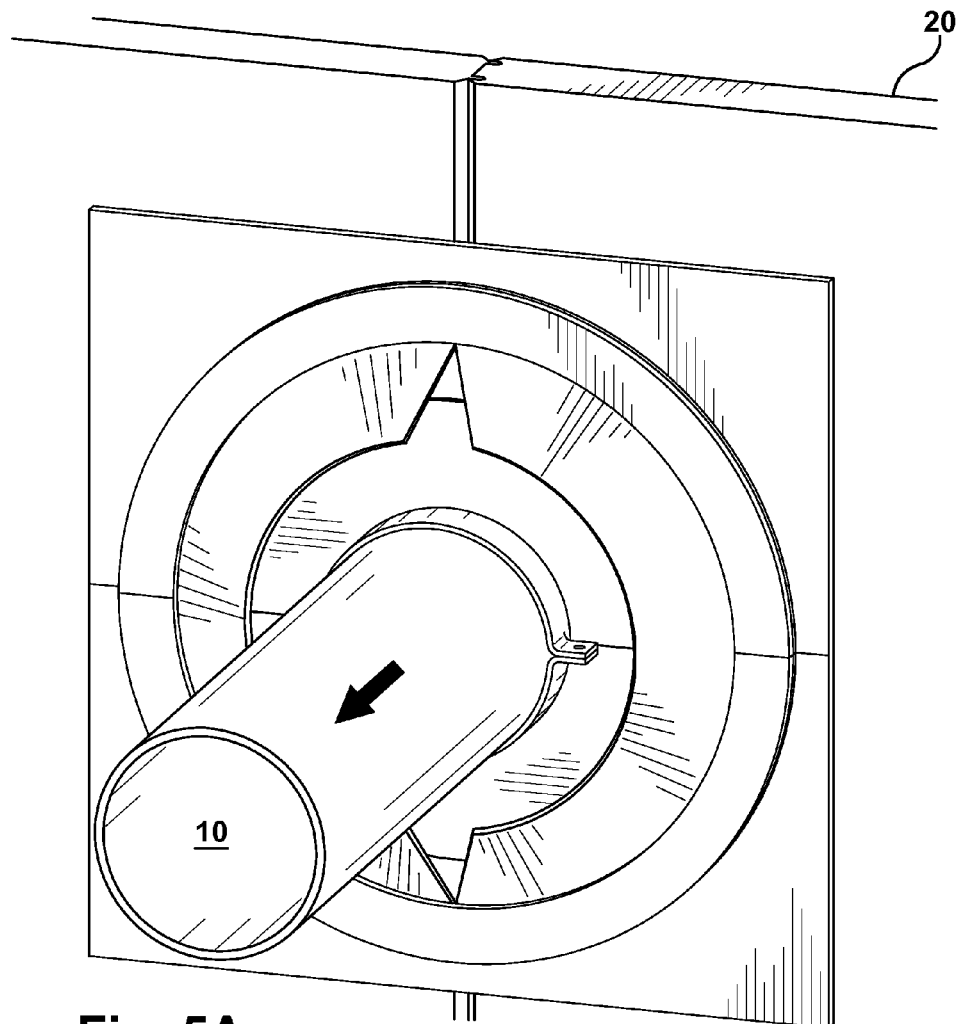
FIG. 5 illustrates axial movement of a conduit relative to a panel according to embodiments of the invention.
Figure 5B:
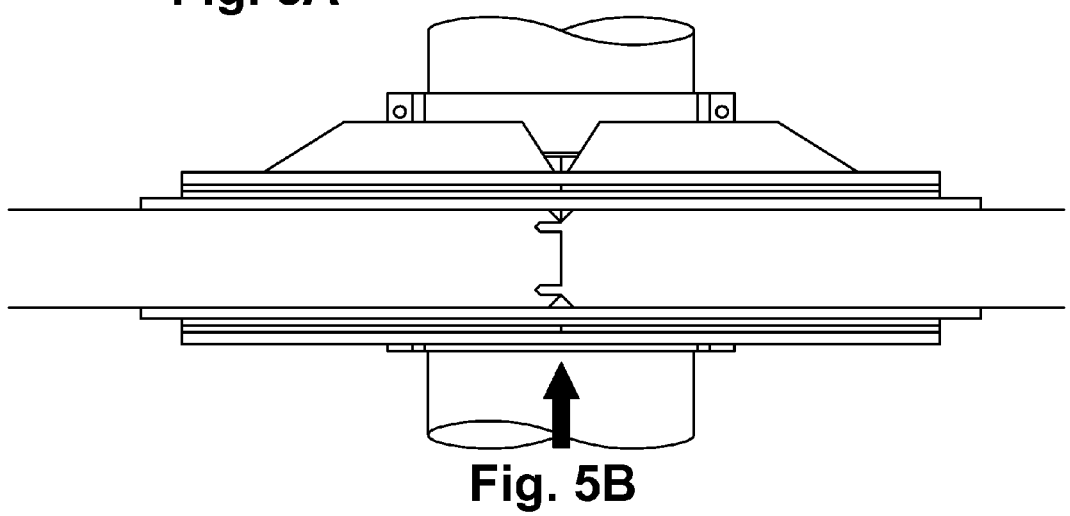
Figure 6A:
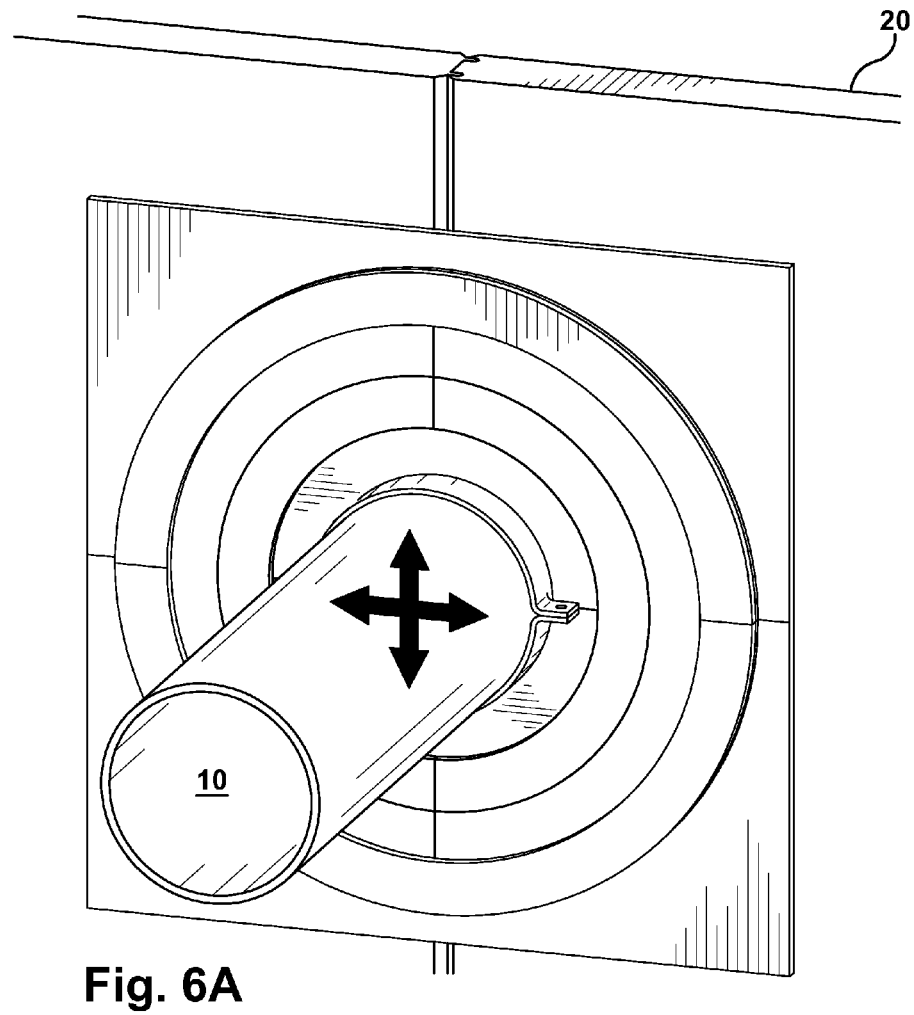
FIG. 6 illustrates translational movement of a conduit relative to a panel according to embodiments of the invention.
Figure 6B:
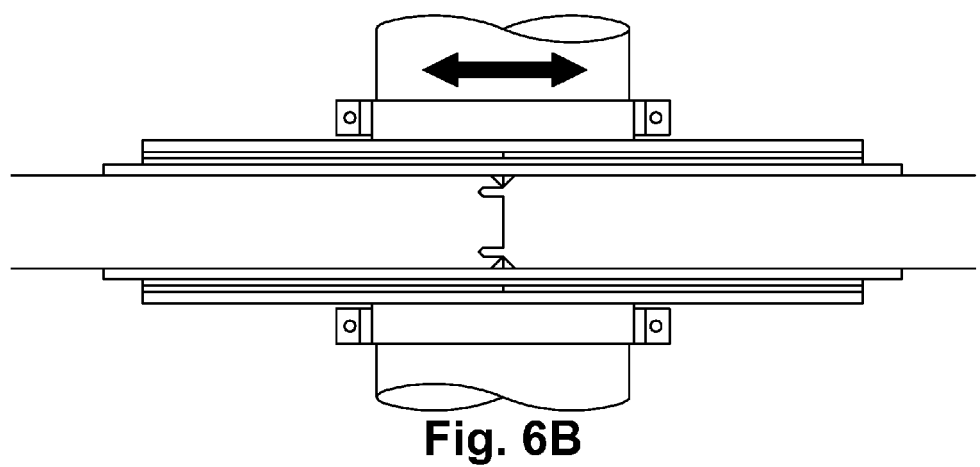

FIGS. 4-6 illustrate rotational, axial and translational movement of conduit 10 with respect to panel 20. The arrow in FIG. 4 illustrates that conduit 10 may rotate relative to panel 20. The arrow in FIG. 5 illustrates axial movement of conduit 10, relative to panel 20. It is understood that conduit 10 may be contiguous with other sections of conduit, but the axial movement referred to herein, refers to movement along the long axis of conduit 10 at the pipe crossing. The arrows in FIG. 6 illustrate translational movement of conduit 10 relative to panel 20.

The apparatus of the present disclosure is not limited to any one particular system of acoustical insulation for conduit or other system, and may be used with other systems where acoustical insulation at a pipe crossing are desired. Additionally, the apparatus of the present invention may be used with other systems not described herein that may benefit from the increased operational range, efficiency, durability and reliability of the apparatus described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "axial" and/or "axially" refer to the relative position/direction of objects along axis A, which is substantially parallel with the long axis of a conduit at a pipe crossing. As further used herein, the terms "radial" and/or "radially" refer to the relative position/direction of objects along radius (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly for a conduit, the assembly comprising:
   a substantially inflexible collar member sized to form an axial seal around the conduit, the substantially inflexible collar member having a flange extending substantially radially; and
   a substantially flexible axial seal member in sealing contact with the substantially inflexible collar member, the substantially flexible axial seal member including a first portion in sealing contact with a first face of the flange and a second portion in sealing contact with a second face of the flange, such that tile flange is positioned between the first portion and the second portion of the substantially flexible axial seal member,
   wherein the substantially flexible axial seal member and the substantially inflexible collar member maintain the axial seal around the conduit and permit axial movement,
   translational movement and rotational movement of the conduit relative to a conduit passage panel,
   wherein the first portion and the second portion of the substantially flexible axial seal member are directly attached to each other and permit translational movement of the conduit by allowing translational sliding of the flange between the first portion and the second portion of the substantially flexible axial seal member relative to the conduit passage panel, and
   wherein the first portion of the substantially flexible axial seal member is located between the conduit passage panel and the second portion of the substantially flexible axial seal member in an axial direction of the conduit.

2. The seal assembly of claim 1, wherein the substantially inflexible collar member is substantially circular and the flange is substantially circular.

3. The seal assembly of claim 1, wherein the substantially flexible axial seal member permits thermal expansion of the conduit.

4. The seal assembly of claim 1, wherein an inner surface of the substantially inflexible collar member substantially complements the outer surface of the conduit.

5. The seal assembly of claim 1, further comprising:
   an adapter for mounting the substantially flexible axial seal member to the conduit passage panel, the conduit passage panel being sized to receive the conduit, the adapter being in sealing contact with one of the first portion and the second portion of the substantially flexible axial seal member, the conduit passage panel having a hole therethrough larger than the substantially flexible axial seal member.

6. The seal assembly of claim 5, further comprising:
   a support member including a first and a second semicircular plate, each semicircular plate including a first part of a mounting system, wherein the first and second portions of the substantially flexible axial seal member includes a second part of the mounting system, and wherein the adapter includes a third part of the mounting system, the third part of the mounting system being complementary to the first part of the mounting system and the second part of the mounting system.

7. The seal assembly of claim 6, wherein the support member and the adapter each include materials having substantially identical coefficients of thermal expansion.

8. The seal assembly of claim 1, wherein the first portion of the substantially flexible axial seal member includes a first and a second semicircular plate mating at a first junction, and wherein the second portion of the substantially flexible axial seal member includes a third and a fourth semicircular plate, the third and fourth semicircular plates mating at a second junction, the second junction being orthogonal to the first junction.

9. The seal assembly of claim 8, wherein the support member and the adapter have a substantially identical material composition.

10. The seal assembly of claim 1, wherein the first and the second portions of the substantially flexible axial seal member each include a first semicircular section and a second semicircular section.

11. The seal assembly of claim 1, wherein the substantially inflexible collar member includes a first part and a second part, the first part mating with the second part in response to being in sealing contact with the conduit.

12. The sealing assembly of claim 1, wherein the substantially inflexible collar member includes a material of equal or greater coefficient of thermal expansion than a material of the conduit.

13. The sealing assembly of claim 1, wherein the substantially flexible axial seal member includes an acoustically-insulating material.

14. An apparatus comprising:
a conduit;
a panel allowing the conduit to pass there through; and
a seal in sealing contact with the conduit and the panel, the seal including:
a substantially inflexible collar member having a flange extending substantially radially; and
a substantially flexible axial seal member in sealing contact with the substantially inflexible collar member, the substantially flexible axial seal member including a first portion in sealing contact with a first face of the flange and a second portion in sealing contact with a second face of the flange, such that the flange is positioned between the first portion and the second portion of the substantially flexible axial seal member, wherein the substantially flexible axial seal member and the substantially inflexible collar member allow for thermal expansion of the conduit and maintain an axial seal around the conduit and permit axial movement, translational movement and rotational movement of the conduit, relative to the panel, wherein the first portion and the second portion of the substantially flexible axial seal member are directly attached to each other and permit translational movement of the conduit by allowing translational sliding of the flange between the first portion and the second portion of the substantially flexible axial seal member relative to the panel, and wherein the first portion of the substantially flexible axial seal member is located between the panel and the second portion of the substantially flexible axial seal member in an axial direction of the conduit.

15. The apparatus of claim 14, wherein the substantially inflexible collar member is substantially circular and wherein the flange is substantially circular.

16. The apparatus of claim 14, further comprising:
an adapter for mounting the substantially flexible axial seal member to the panel, wherein the adapter is sized to receive the conduit, the adapter being in sealing contact with one of the first portion and the second portion of the substantially flexible axial seal member, and wherein the panel has a hole therethrough larger than the substantially flexible axial seal member.

17. The apparatus of claim 16, wherein the support member and the adapter include materials having substantially identical coefficients of thermal expansion.

18. The apparatus of claim 16, further comprising:
a support member including;
a first semicircular plate; and
a second semicircular plate, each of the first and the second semicircular plates including a first part of a mounting assembly,
wherein the substantially flexible axial seal member includes a second part of a mounting assembly, and
wherein the adapter includes a third part of the mounting assembly, the third part of the mounting assembly being complementary to the first, and second parts of the mounting assembly.

19. The apparatus of claim 14, wherein the substantially flexible axial seal member includes an acoustically-insulating material.

* * * * *